US012801375B2

(12) United States Patent
Zand et al.

(10) Patent No.: US 12,801,375 B2
(45) **Date of Patent: *Nov. 17, 2026**

(54) SOURCE CODE CORRECTION SYSTEM USING VALIDATION RULES

(71) Applicant: PALO ALTO NETWORKS (ISRAEL ANALYTICS) LTD., Tel Aviv (IL)

(72) Inventors: Tohar Zand, Tel Aviv (IL); Nimrod Kor, Kfar Saba (IL); Rotem Avni, Tel Aviv (IL); Naor David, Herzliya (IL); Ariel Kruszyn, Kfar Saba (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 18/502,013

(22) Filed: Nov. 5, 2023

(65) Prior Publication Data

US 2024/0061675 A1 Feb. 22, 2024

Related U.S. Application Data

(63) Continuation-in-part of application No. 17/722,410, filed on Apr. 18, 2022, now Pat. No. 11,842,189.

(51) Int. Cl.
*G06F 8/70* (2018.01)
*G06F 11/3604* (2025.01)

(52) U.S. Cl.
CPC ............ *G06F 8/70* (2013.01); *G06F 11/3604* (2013.01)

(58) Field of Classification Search
None
See application file for complete search history.

(56) References Cited

U.S. PATENT DOCUMENTS

| | | | | |
|---|---|---|---|---|
| 10,185,924 | B1 * | 1/2019 | McClintock | H04L 63/1433 |
| 10,423,410 | B1 * | 9/2019 | Goyal | G06F 8/77 |
| 10,785,128 | B1 * | 9/2020 | Bawcom | G06F 8/38 |
| 11,914,993 | B1 * | 2/2024 | Garg | G06F 8/77 |
| 2004/0205707 | A1 * | 10/2004 | Kothari | G06F 8/30 717/113 |
| 2005/0204340 | A1 * | 9/2005 | Ruminer | G06F 8/70 717/123 |

(Continued)

OTHER PUBLICATIONS

"Checkov 2.0 Launches as the First Open-Source Cloud Infrastructure Scanner With Dependency Awareness," <https://www.paloaltonetworks.com/company/press/2021/checkov-2-0-launches-as-the-first-open-source-cloud-infrastructure-scanner-with-dependency-awareness>, Apr. 8, 2021, p. 1-4. (Year: 2021).*

*Primary Examiner* — Qing Chen
(74) *Attorney, Agent, or Firm* — Meitar Patents LTD.; Daniel Kligler

(57) ABSTRACT

A method, including accessing a corpus of source code listings including respective code elements, and accessing a repository of validation rules defining respective acceptable security parameters for the code elements. The validation rules are applied to the code elements so as to identify a first set of the code elements not in compliance with the validation rules and a second set of the code elements in compliance with the validation rules. A first code element not in compliance with a given validation rule is selected from the first set, and one or more second code elements in compliance with the given validation rule are identified in the second set. Finally, the first and the second code elements can be output together so as to invoke a revision of the first code element.

18 Claims, 7 Drawing Sheets

(56) References Cited

U.S. PATENT DOCUMENTS

| | | | | |
|---|---|---|---|---|
| 2006/0041879 | A1* | 2/2006 | Bower | G06F 9/451 717/165 |
| 2007/0168917 | A1* | 7/2007 | Janson | G06F 11/3604 717/101 |
| 2008/0004893 | A1* | 1/2008 | Graboske | G06Q 30/0278 705/306 |
| 2008/0109329 | A1* | 5/2008 | Fichtinger | G06Q 10/0875 705/29 |
| 2009/0055804 | A1* | 2/2009 | Blaschek | G06F 11/3616 717/126 |
| 2009/0144698 | A1* | 6/2009 | Fanning | G06F 11/3676 717/120 |
| 2009/0182689 | A1* | 7/2009 | Chiles | G06N 5/025 706/59 |
| 2009/0183137 | A1* | 7/2009 | Ponnath | G06F 8/20 717/101 |
| 2010/0325607 | A1* | 12/2010 | Meijer | G06F 8/447 717/137 |
| 2011/0184938 | A1* | 7/2011 | Hill | G06F 8/71 707/E17.014 |
| 2014/0109062 | A1* | 4/2014 | Mahamuni | G06F 11/323 717/126 |
| 2014/0250427 | A1* | 9/2014 | Wong | G06F 8/73 717/126 |
| 2014/0366140 | A1* | 12/2014 | Chen | G06F 21/577 726/25 |
| 2016/0004517 | A1* | 1/2016 | Safary | G06F 8/436 717/131 |
| 2016/0054983 | A1* | 2/2016 | Balasubramanian | G06F 8/70 717/113 |
| 2016/0292066 | A1* | 10/2016 | Stevens | G06F 11/3624 |
| 2016/0373289 | A1* | 12/2016 | Hernandez | H04L 41/16 |
| 2018/0107478 | A1* | 4/2018 | Codato | G06F 8/71 |
| 2019/0079734 | A1* | 3/2019 | Kadam | G06F 21/105 |
| 2019/0121310 | A1* | 4/2019 | Riedl | G05B 19/0425 |
| 2019/0163446 | A1* | 5/2019 | Brunel | G06F 8/74 |
| 2019/0272168 | A1* | 9/2019 | Mani Nadar | G06F 11/3688 |
| 2019/0318366 | A1* | 10/2019 | Carranza | G06Q 30/018 |
| 2020/0097261 | A1* | 3/2020 | Smith | G06F 8/33 |
| 2022/0067168 | A1* | 3/2022 | De Cremer | G06F 9/451 |
| 2022/0291906 | A1* | 9/2022 | Bahrami | G06F 8/41 |
| 2023/0139119 | A1* | 5/2023 | Mietke | G06F 8/24 717/110 |

* cited by examiner

SOURCE CODE CORRECTION SYSTEM USING VALIDATION RULES

CROSS-REFERENCE TO RELATED APPLICATIONS

This application is a continuation-in-part of U.S. patent application Ser. No. 17/722,410 (now issued as U.S. Pat. No. 11,842,189), filed Apr. 18, 2022, which is incorporated herein by reference.

FIELD OF THE INVENTION

The present invention relates generally to static code analysis, and particularly to detecting misconfigured source code and presenting one or more correctly configured alternatives that can be used to update the misconfigured source code.

BACKGROUND OF THE INVENTION

Source code analysis is a critical practice in the realm of cybersecurity and software development. It involves the systematic examination of code elements in a software application's source code to identify and remediate potential vulnerabilities, weaknesses, and security threats. This process enables developers and security professionals to uncover issues such as buffer overflows, injection attacks, and other common software vulnerabilities that could be exploited by malicious actors. Source code analysis tools and techniques aim to assess the code's adherence to secure coding practices, highlight any improper input validation, and pinpoint areas where sensitive data may be at risk. By proactively identifying and addressing these security concerns, organizations can bolster their software's resilience to cyberattacks and protect both their data and the integrity of their applications.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method, including accessing a corpus of source code listings including respective code elements, accessing a repository of validation rules defining respective acceptable security parameters for the code elements, applying the validation rules to the code elements so as to identify a first set of the code elements not in compliance with the validation rules and a second set of the code elements in compliance with the validation rules, selecting, from the first set, a first code element not in compliance with a given validation rule, identifying, in the second set, one or more second code elements in compliance with the given validation rule, and outputting the first and the second code elements together to invoke a revision of the first code element.

In some embodiments, the source code listings are for one or more software applications.

In one embodiment, invoking the revision of the first code element includes replacing the first code element with a given second code element.

In another embodiment, invoking the revision of the first code element includes adding a given second code element to the first code element.

In an additional embodiment, outputting the first and the second code elements together includes presenting, on a display, the first code element and at least one of the second code elements.

In some embodiments, the method further includes receiving an input indicating a selection of a given presented second code element, and replacing, in response to the received input, a given first code element with the selected second code element.

In a supplemental embodiment, the method further includes identifying a plurality of distinct second code elements.

In one embodiment, the method further includes computing respective counts of instances of the distinct second code elements, and sorting the distinct second code elements by their respective counts into a sorted order, and wherein presenting the second code elements includes presenting the distinct second code elements in the sorted order.

In another embodiment, the method further includes computing respective statistics for the distinct second code elements, and wherein presenting the second code elements includes presenting the distinct second code elements and their respective statistics.

In an additional embodiment, the method further includes applying specified criteria to the computed statistics, and identifying one or more of the distinct second code elements whose respective statistics comply with the criteria, and wherein presenting the second code elements includes presenting the distinct second code elements compliant with the specified criteria.

In a supplemental embodiment, the method further includes computing respective counts of instances of the distinct second code elements, and wherein the statistics include the computed counts.

In some embodiments, the method further includes computing respective percentages of instances of the distinct second code elements, and wherein the statistics include the computed percentages.

In other embodiments, the validation rules include respective severity levels, and the method further includes presenting, on the display, the severity level for the given validation rule.

In one embodiment, the validation rules include respective error messages, and the method further includes presenting, on the display, the error message for the given validation rule.

In another embodiment, the method further includes identifying respective intended uses of the code elements, wherein the first code element has a given intended use, and wherein identifying the one or more second code elements includes identifying the one or more second code elements having the given intended use.

In a further embodiment, the method also includes generating, by the processor, a replacement code element in compliance with the given validation rule and having the given intended use, and outputting the first and the replacement code elements together to invoke a revision of the first code element.

In a supplemental embodiment, the method further includes generating, based on the given intended use, a description of a security risk in the first code element, and outputting the description.

There is also provided, in accordance with an embodiment of the present invention, an apparatus, including a memory configured to store a corpus of source code listings including respective code elements, and a repository of validation rules defining respective acceptable configuration parameters for the resource definitions. The apparatus also includes at least one processor configured to access the corpus of source code listings and the repository of validation rules, to apply the validation rules to the code elements so as to identify a first set of the code elements not in compliance with the validation rules and a second set of the code elements in compliance with the validation rules, to select, from the first set, a first code element not in compliance with a given validation rule, to identify, in the second set, one or more second code elements in compliance with the given validation rule, and to output the first and the second code elements together to invoke a revision of the first code element.

There is additionally provided, in accordance with an embodiment of the present invention, a computer software product, the product including a non-transitory computer-readable medium, in which program instructions are stored, which instructions, when read by a computer, cause the computer to access a corpus of source code listings including respective code elements, to access a repository of validation rules defining respective acceptable security parameters for the code elements, to apply the validation rules to the code elements so as to identify a first set of the code elements not in compliance with the validation rules and a second set of the code elements in compliance with the validation rules, to select, from the first set, a first code element not in compliance with a given validation rule, to identify, in the second set, one or more second code elements in compliance with the given validation rule, and to output the first and the second code elements together to invoke a revision of the first code element.

BRIEF DESCRIPTION OF THE DRAWINGS

The disclosure is herein described, by way of example only, with reference to the accompanying drawings, wherein.

DETAILED DESCRIPTION OF EMBODIMENTS

Static analysis of source code listings can detect misconfigured code elements. Large-scale deployments of cloud-based systems may comprise thousands of files comprising millions of lines of source code for software applications deployed to cloud-based servers. While a static analysis system can employ a large number of rules to identify different types of misconfigured source code elements, manually fixing these misconfigurations can be an arduous task. For example, if there are 1000 rules, an application security engineer would need to know how to fix each detected rule violation in the source code listings.

Embodiments of the present invention provide methods and systems for detecting security vulnerabilities in source code listings and recommending fixes to misconfigured source code elements in the source code listings. In the above-mentioned U.S. patent application Ser. No. 17/722,410, methods and systems of these sorts were applied to source code used in Infrastructure as Code (IaC). In the present embodiments, similar methods and systems are applied to source code listings for one or more software applications.

As described hereinbelow, a corpus of source code listings comprising respective code elements are accessed. Upon accessing a repository of validation rules defining respective acceptable security parameters for the code elements, the validation rules can be applied to the code elements so as to identify a first set of the code elements not in compliance with the validation rules and a second set of the code elements in compliance with the validation rules. A first code element not in compliance with a given validation rule can be selected from the first set, and upon one or more second code elements in compliance with the given validation rule being identified in the second set, the first and the second code elements can be output together to invoke a revision of the first code element.

In some embodiments, the source code listings are for one or more software applications. By presenting, to an application security engineer, the one or more compliant source code elements as possible remedies for the non-compliant source code element, systems implementing embodiments of the present invention can significantly reduce the mean time to resolve (MTTR) any source code elements for a software application that expose the software application to security risks. Additionally, by presenting existing compliant source code elements to the application security engineer, systems implementing embodiments of the present invention can assist the application security engineer in making revisions to the code that are not only compliant with the verification rules, but also take advantage of previously coded "tried and true" resource definitions.

System Description

Figure 1:
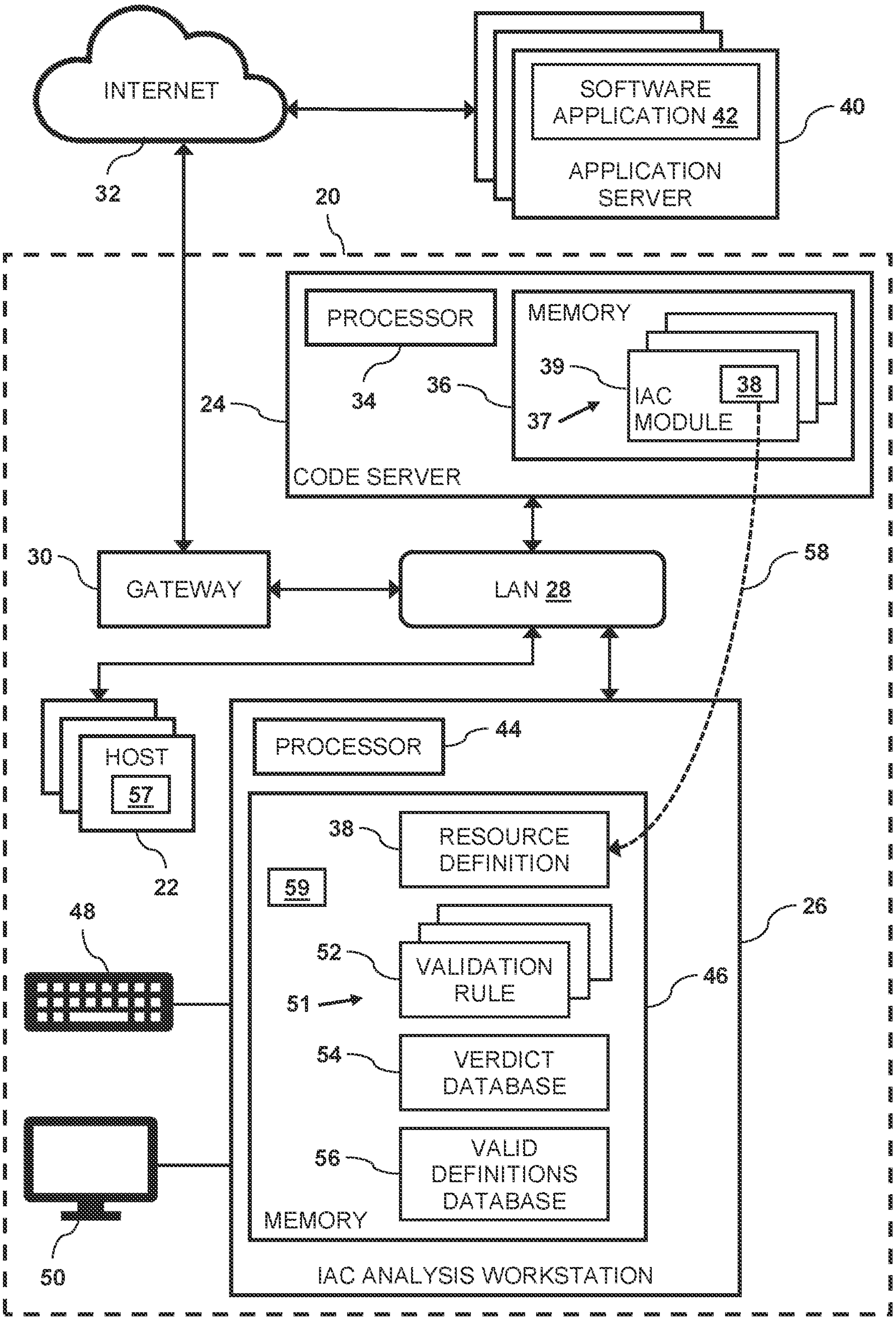
FIG. 1 is a block diagram that schematically shows a computing facility comprising an Infrastructure as Code (IaC) analysis engine configured to detect and correct misconfigured IaC resource definitions, in accordance with an embodiment of the present invention.

FIG. 1 is a block diagram that schematically shows an example of a computing facility 20 comprising a set of development host computers 22, a code server 24 and an Infrastructure as Code (IaC) analysis engine 26 that can communicate with each other over a local area network 28, in accordance with an embodiment of the present invention. In the configuration shown in FIG. 1, computing facility 20 also comprises a gateway 30 that couples local area network 28 to a public data network 32 such as the Internet.

Code server 24 may comprise a server processor 34 and a server memory 36 that can store a corpus 37 of IaC modules 39 that comprise respective resource definitions 38. In some embodiments, IaC resource definitions 38 (also referred to herein simply as resource definitions 38) can be used to define a set of computing resources 40 such as application servers that can be configured to execute one or more software applications 42. In embodiments herein, computing resources 40 may also be referred to as application servers 40.

While embodiments described herein use resource definitions 38 to define application servers 40, using the resource definitions to define other types of resources is considered to be within the spirit and scope of the present invention. For example, resource definitions 38 can be used to define resources such as databases, computing devices, networks cloud workload (e.g., servers, containers, and serverless functions) and load balancers. Resource definitions are described in the description referencing FIG. 2 hereinbelow.

In some embodiments, application developers (not shown) can operate development host computers 22 to create and modify resource definitions 38. In embodiments described herein, resource definitions 38 comprise IaC source code. For example, the application developers can use an IaC development tool (also known as frameworks) such as TERRAFORM™ (produced by HASHICORP, INC., 101 2nd Street, Suite #700 San Francisco, CA 94105 USA) to create and manage resource definitions 38 for cloud computing services such as AMAZON WEB SERVICES™ (AWS™), provided by AMAZON.COM, INC., 410 Terry Avenue North Seattle, WA 98109 USA.

IaC analysis engine 26 comprises an analysis processor 44, an analysis memory 46, an input device 48 such as a keyboard and a display 50 such as an L.E.D. monitor. In the configuration shown in FIG. 1, memory 46 stores a repository 51 comprising validation rules 52, a verdict database 54 and a valid definitions database 56, which are respectively described in the descriptions referencing FIGS. 3, 4 and 5 hereinbelow.

As described hereinbelow, processor 44 can retrieve, via network 28 (as indicated by an arrow 58), a given resource definition 38, and apply a given validation rule 52 to the given resource definition so as to determine whether or not the given resource definition is in compliance with the given validation rule.

In some embodiments, host computers 22 can store and execute software applications 57. In additional embodiments, memory 46 may also comprise a large language model 59, which processor 44 can use in analyzing valid definitions database 56, as described hereinbelow.

Processors 34 and 44 comprise general-purpose central processing units (CPU) or special-purpose embedded processors, which are programmed in software or firmware to carry out the functions described herein. This software may be downloaded to code server 24 or IaC analysis engine 26 in electronic form, over a network, for example. Additionally or alternatively, the software may be stored on tangible, non-transitory computer-readable media, such as optical, magnetic, or electronic memory media. Further additionally or alternatively, at least some of the functions of processors 34 and 44 may be carried out by hard-wired or programmable digital logic circuits.

Examples of memories 36 and 46 include dynamic random-access memories, non-volatile random-access memories, hard disk drives and solid-state disk drives.

In some embodiments, tasks described herein performed by hosts 22, code server 24, processor 34 and application servers 40 may be split among multiple physical and/or virtual computing devices such as physical server and/or virtual server. In other embodiments, these tasks may be performed in a managed cloud service.

Figure 2:
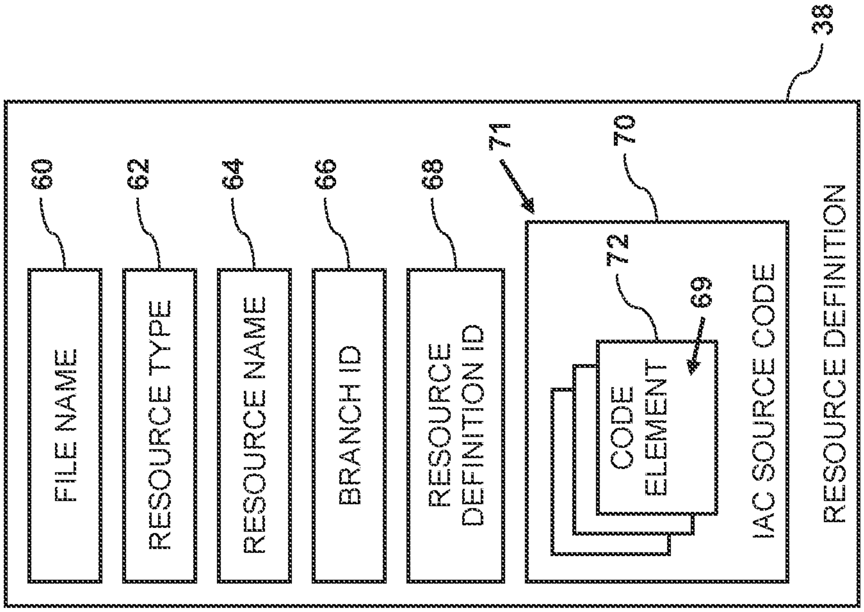
FIG. 2 is a block diagram showing an example of an IaC resource definition, in accordance with an embodiment of the present invention.

FIG. 2 is a block diagram showing an example of data components stored in resource definition 38, in accordance with an embodiment of the present invention. In some embodiments, processor 44 can store the following information to each given resource definition 38:

- A file name 60 that stores a name of a file (e.g., a given IaC module 39) storing the given resource definition.
- A resource type 62 indication a type of resource defined by the given resource definition. For example, in AWS™, a given resource type may be a relational database service (RDS) cluster (aws_rd_cluster) or an isolated database instance (aws_db_instance).
- A resource name 64 indicating a name of the resource defined by the given resource definition.
- A branch identifier (ID) 66. In some embodiments, corpus 37 may comprise multiple branches (not shown) of IaC source code for computing resources 40. In these embodiments, the multiple branches can be referenced by respective branch IDs 66.
- A resource definition ID 68 comprising a unique identifier for the given resource definition. For example, the resource definition ID for the given resource definition may comprise a concatenation of resource type 62, resource name 64 and branch ID 66.
- An IaC source code listing 70 that for the given resource definition. In some embodiments, the IaC source code listing comprises one or more code elements 72 (also referred to herein as source code elements 72). In embodiments described herein, code elements 72 comprise fragments of computer code (e.g., IaC source code), which can be any piece of computer readable text. Examples of code elements 72 include resources, resource declarations, parameters, variables, variable declarations and values. Therefore, code elements 72 may be also referred to herein as resources 72, resource declarations 72, parameters 72, variables 72, variable declarations 72 and values 72.

The following is an example of a given resource definition 38:

```
resource “aws_rds_cluster” “fail” {
  allocated_storage       = 10
  backup_retention_period = “25”
}
```

In this example:

File name 60 comprises rds.tf

Resource type 62 comprises “aws_rds_cluster”.

Resource name 64 comprises “aws_rds_cluster.fail”.

IaC source code listing 70 comprises:

```
{
allocated_storage = 10
backup_retention_period = “25”
}
```

In some embodiments, code elements 72 may have respective contexts 69 (i.e., intended uses), which are described hereinbelow. Additionally, source code listings 70 may have respective categories indicating respective stages in the development cycle of the source code listings (e.g., development, testing, and production).

Figure 3:
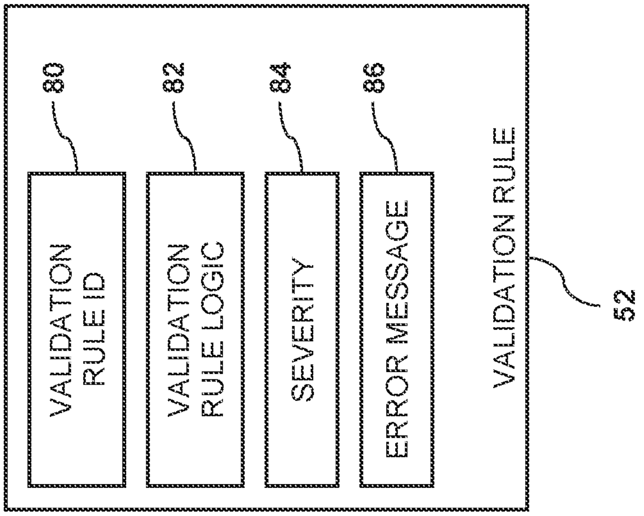
FIG. 3 is a block diagram showing an example of a validation rule that the IaC analysis engine can use to detect a misconfigured IaC resource definition, in accordance with an embodiment of the present invention.

FIG. 3 is a block diagram showing an example of data components stored in validation rules 52, in accordance with an embodiment of the present invention. In some embodiments, processor 44 can store the following information to each given validation rule 52:

- A unique validation rule ID 80 for a given validation rule 52.
- Validation rule logic 82. When applying the given validation rule to a given resource definition 38, validation rule logic 82 describes conditions for determining whether or not the given resource definition is in compliance with the given validation rule.
- A severity 84. When applying the given validation rule to a given resource definition 38, severity 84 indicates a severity level (e.g., "low", "medium" or "high") if the given resource definition is not in compliance with the given validation rule. For example:
  - The severity may be "low" for a misconfigured port range.
  - The severity may be "medium" for a misconfigured backup retention period.
  - The severity may be "high" if a server is configured to accept traffic from any IP address.
- An error message 86. When applying the given validation rule to a given resource definition 38, processor 44 can present error message 86 on display 50.

For example, one parameter for the AWS resource type "aws_rds_cluster" is the "backup_retention_period" parameter which indicates how many days of backups to retain (i.e., a backup retention period) for an RDS cluster. In this example:

- Validation rule logic 82 comprises checking (a) if the resource definition for the RDS cluster comprises a "backup_retention_period" parameter, and (b) in instances where resource definition for the RDS cluster comprises a "backup_retention_period" parameter, if the value assigned to the "backup_retention_period" parameter is greater than a specified threshold (e.g., "1"). In some embodiments, this validation rule will fail if either there is no backup retention period defined or if the assigned value is less than the specified threshold.
- Severity 84 comprises "medium".
- Error message 86 comprises "Ensure RDS instances have backup policy".

Figure 4:
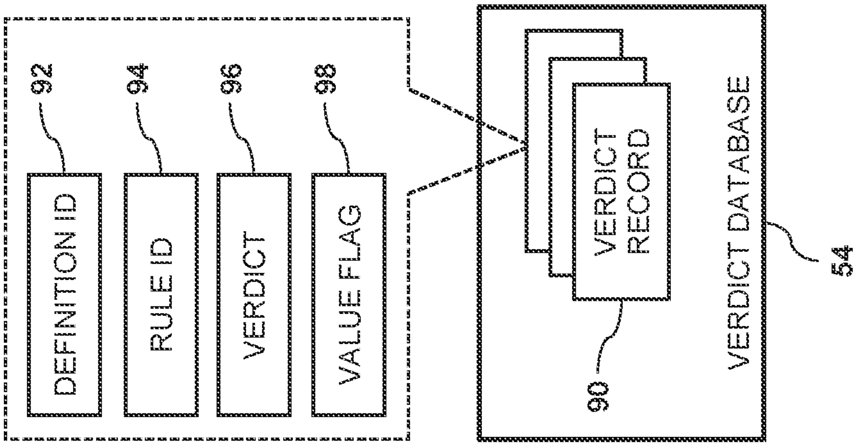
FIG. 4 is a block diagram showing an example of a verdict database that the IaC analysis engine can use to track misconfigured IaC resource definitions, in accordance with an embodiment of the present invention.

FIG. 4 is a block diagram showing an example of data components stored in verdict database 54, in accordance with an embodiment of the present invention. In embodiments described herein, processor 44 can apply a given validation rule 52 to a given resource definition 38 so as to determine whether or not the given resource definition is in compliance with the given rule.

In some embodiments, verdict database 54 comprises a set of verdict records 90 that can store the following information:

- A resource definition ID 92 comprising a given resource definition ID 68 that references a given resource definition 38.
- A validation rule ID 94 comprising a given validation rule ID 80 that references a given validation rule 52.
- A verdict 96 indicating whether or not the referenced resource definition is in compliance with the referenced validation rule. For example, each given verdict 96 may comprise "compliant" or "non-compliant".
- A value flag 98 indicating whether processor 44 computed verdict 96 based on a value in the referenced resource definition or based on a dependency (i.e., in the referenced resource definition) on a value stored in a different resource definition 38. For example, processor 44 can store "true" if verdict 96 based on a value in the referenced resource definition, and store "false" if verdict 96 based on a dependency. An example of dependencies for resource definitions 38 is described in the description referencing FIG. 7 hereinbelow.
- In one embodiment, upon processor 44 detecting that, in a given verdict record 90, value flag 98 comprises "false", the analysis processor can change verdict 96 (i.e., in the given verdict record) to "dependent", thereby indicating a dependency in the verdict.

In additional embodiments, processor 44 may apply multiple validation rules 52 to a given resource definition 38. In these embodiments, processor 44 can create a corresponding multiple of verdict records 90 for the given resource definition, i.e., one for each of the applied validation rules 52.

Figure 5:
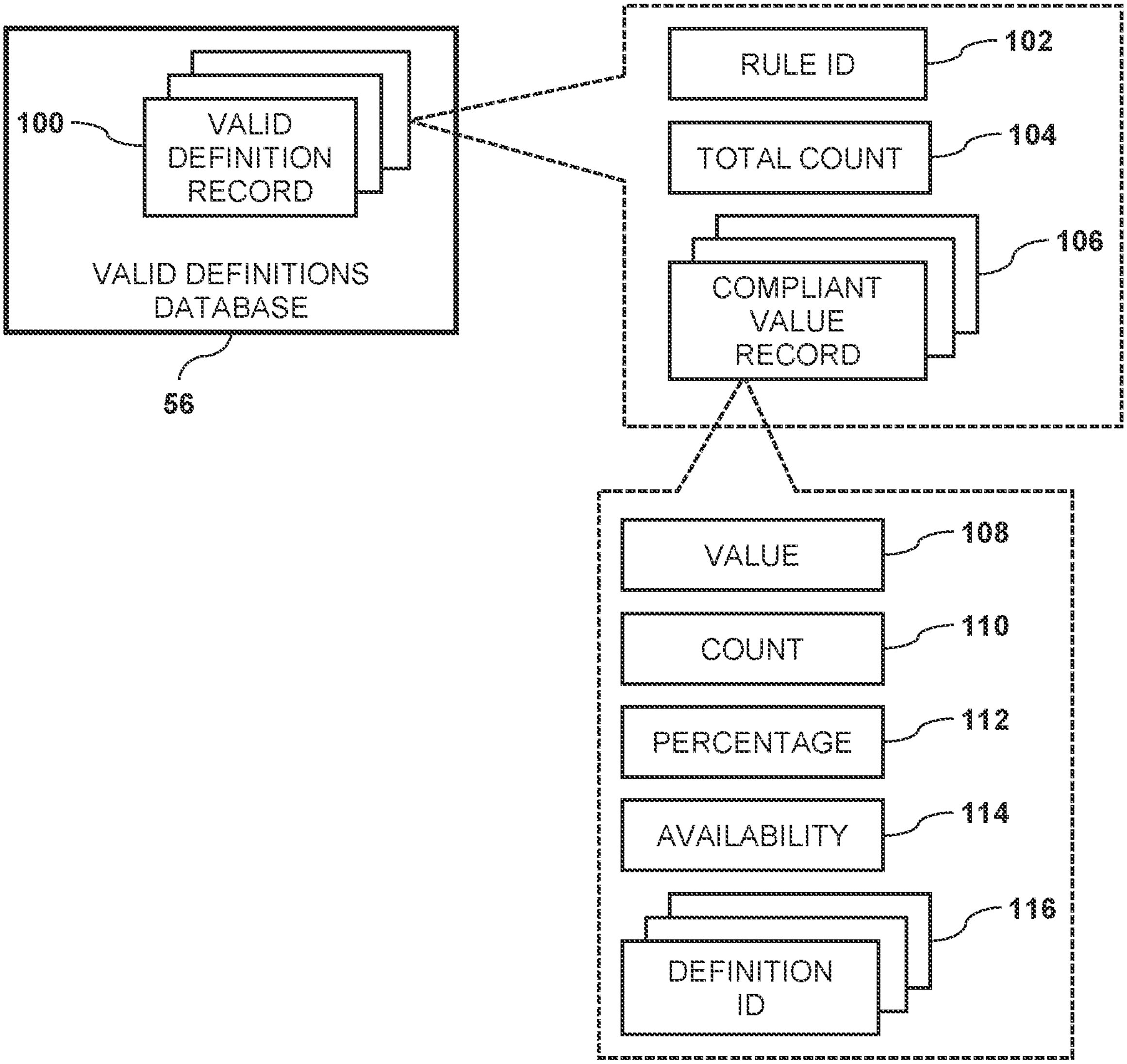
FIG. 5 is a block diagram showing an example of a valid definitions database that IaC analysis engine can use to provide examples of correctly configured IaC resource definitions, in accordance with an embodiment of the present invention.

FIG. 5 is a block diagram showing an example of data components stored in valid definitions database 56, in accordance with an embodiment of the present invention. As described hereinbelow, when presenting (i.e., on display 50) a given resource definition 38 that is not in compliance with a given validation rule 52, processor 44 can also present one or more resource definitions 38 in compliance with the given validation rule. In some embodiments, processor 44 can use valid definitions database 56 to identify the one or more resource definitions in compliance with the given validation rule.

Valid definitions database 56 may comprise a set of valid definition records 100 that can store the following information:

- A validation rule ID 102 referencing a given validation rule 52. In some embodiments, validation rule IDs 102 have a one-to-one correspondence with validation rules 52.
- A total count 104. In some embodiments, upon applying validation rules 52 to resource definitions 38, processor 44 can compute total count 104 as the number of the resource definitions in compliance with the validation rule referenced by validation rule ID 102.
- One or more compliant value records 106 that can store information such as:
  - A compliant value 108. In some embodiments, the given validation rule may comprise compliant values 72 (i.e., with respect to the validation rule referenced by rule ID 102) assigned to a given parameter 72 (e.g., parameter "backup_retention_period", as described supra). In these embodiments, the resource definitions in compliance with the given validation rule may comprise one or more distinct compliant values 72 for the given code element, and processor 44 can create a respective compliant value record 106 for each of the distinct compliant values and store the respective distinct compliant values to compliant values 108.
  - A value count 110. In some embodiments, processor 44 can compute a count of resource definitions 38 in compliance with the given validation rule and that comprise value 106, and then store the computed count to value count 110.

- A value percentage 112. In some embodiments, processor 44 can compute value percentage 112 as value count 110 divided by total count 104.
- An availability flag 114. As described supra, when presenting (i.e., on display 50) a given resource definition 38 that is not in compliance with a given validation rule 52, processor 44 can also present one or more resource definitions 38 in compliance with the given validation rule. In some embodiments, processor 44 may apply specified criteria to compliant value 108, and then set availability flag 114 to either YES (i.e., available) if compliant value 108 meets the specified criteria or NO (i.e., not available) if value 108 does not meet the specified criteria. In these embodiments, processor can present defined resources 38 that are (a) in compliance with the given validation rule and (b) whose availability flags 114 indicate their respective availability. An example of a given specified criteria is described in the description referencing FIG. 8 hereinbelow.
- A set of resource definition IDs 116 that reference respective resource definition IDs 68 for resource definitions 38 in compliance with the given validation rule and that comprise compliant value 108.

In embodiments herein, value count 110 and value percentage 112 may also be referred to as computed statistics.

INFRASTRUCTURE AS CODE COMPLIANCE ANALYSIS

Figure 6:
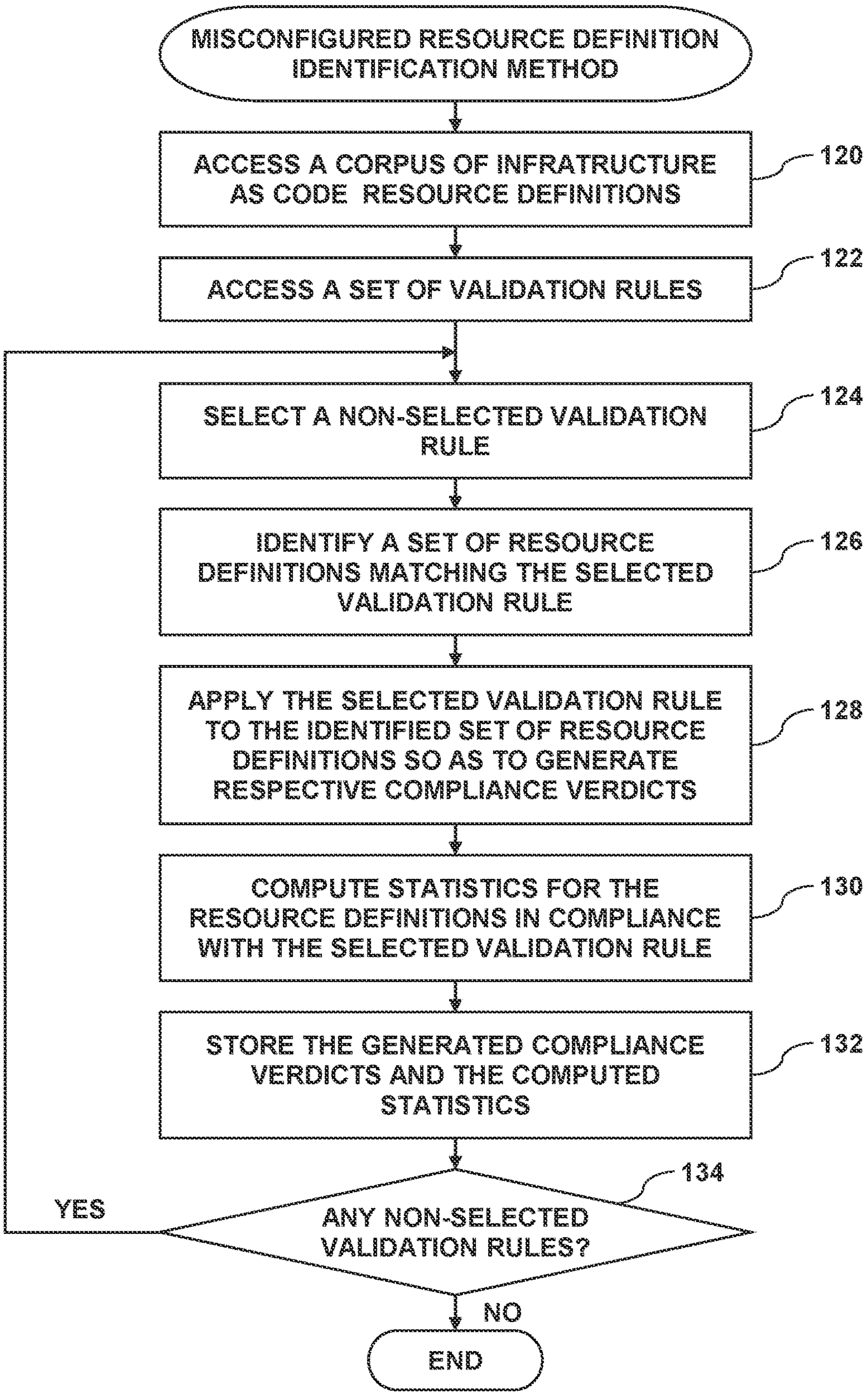
FIG. 6 is a flow diagram that schematically illustrates a method of detecting misconfigured IaC resource definitions, in accordance with an embodiment of the present invention.

FIG. 6 is a flow diagram that schematically illustrates a method of identifying misconfigured resource definitions 38, in accordance with an embodiment of the present invention. In embodiments described herein, resource definitions 38 comprise code elements 72 that processor 44 can analyze using a static analysis tool such as CHECKOV™ (produced by BRIDGECREW, a division of PALO ALTO NETWORKS, INC., of 3000 Tannery Way, Santa Clara, CA 95054 USA).

In step 120, processor 44 accesses corpus 37 comprising IaC resource definitions 38. In embodiments described herein, resource definitions 38 comprise respective code elements 72 that can be used to provision and deploy computing resources 40 that are configured to execute one or more software applications 42.

In step 122, processor 44 accesses repository 51 that comprises a set of validation rules 52. In embodiments described herein, validation rules 52 define respective acceptable configuration parameters for the resource definitions 38.

In step 124, processor 44 selects a given validation rule 52 that has not yet been processed by steps 126-132 described hereinbelow.

In step 126, processor 44 compares the selected validation rule to resource definitions 38 so as to identify any resource definitions 38 to which the selected validation rule can be applied. For example, as described supra, a given validation rule may indicate one or more valid values (or a valid range) for the "backup_retention_period" parameter. Since the "backup_retention_period" parameter only applies to the AWS resource type "aws_rds_cluster", processor 44 can scan corpus 37 so as to identify any resource definitions 38 that define an "aws_rds_cluster" instance.

In step 128, if processor 44 identifies one or more resource definitions 38 to which the selected validation rule can be applied, then in step 130, the analysis processor applies the selected validation rule to each given identified resource definition so as to generate a respective verdict 96. Using the "backup_retention_period" parameter example described supra, if processor 44 applies the selected rule (i.e., comprising valid values for the "backup_retention_period" parameter) to a given identified resource definition 38, then the analysis processor can set the respective verdict 96 to:

- "compliant" if the value for the "backup_retention_period" parameter in the given identified resource definition matches any of the values or is within the valid range in the selected rule.
- "non-compliant" if the value for the "backup_retention_period" parameter in the given identified resource definition does not match any of the values or is not within the valid range in the selected rule.
- "non-compliant" if the given identified resource definition does not comprise the "backup_retention_period" parameter.

Returning to the flow diagram in FIG. 6, in step 132, processor 44 uses embodiments described in the description referencing FIGS. 4 and 5 hereinabove to update databases 54 and 56 with information extracted while processing step 130. Specifically, for each resource definition 38 to which processor 44 applied the selected validation rule (i.e., in step 130), the analysis processor can add a new corresponding verdict record 90 and populate the data components in the new verdict record using embodiments described supra.

In some embodiments, processor 44 can initialize valid definitions database 56 prior to performing step 124 (i.e., for the first time) by creating a corresponding valid definition record 100 for each validation rule 52. In these embodiments, processor 44 can update the valid definitions database (i.e., in step 132) by identifying the valid definition record corresponding to the selected validation rule, and then updating the identified valid definition record using embodiments described supra.

In some embodiments, processor 44 may detect a dependency in a given resource definition 38 when performing step 130. In these embodiments, processor 44 can resolve the dependency, and apply the selected validation rule to the resolved dependency. In one embodiment, the dependency can be resolved within the given resource definition. In another embodiment, processor 44 can resolve the dependency by analyzing a different resource definition 38 referenced by the given resource definition.

If processor 44 does not detect a dependency in a given resource definition 38, or can resolve the dependency within the (i.e., same) given resource definition, then the analysis processor can set the value flag to "TRUE" in the verdict record corresponding to the given resource definition. However, if processor cannot resolve the dependency within the given resource definition (i.e., but can resolve the dependency via a different resource definition 38), then the analysis processor can set the value flag to "FALSE" in the verdict record corresponding to the given resource definition.

Figure 7:
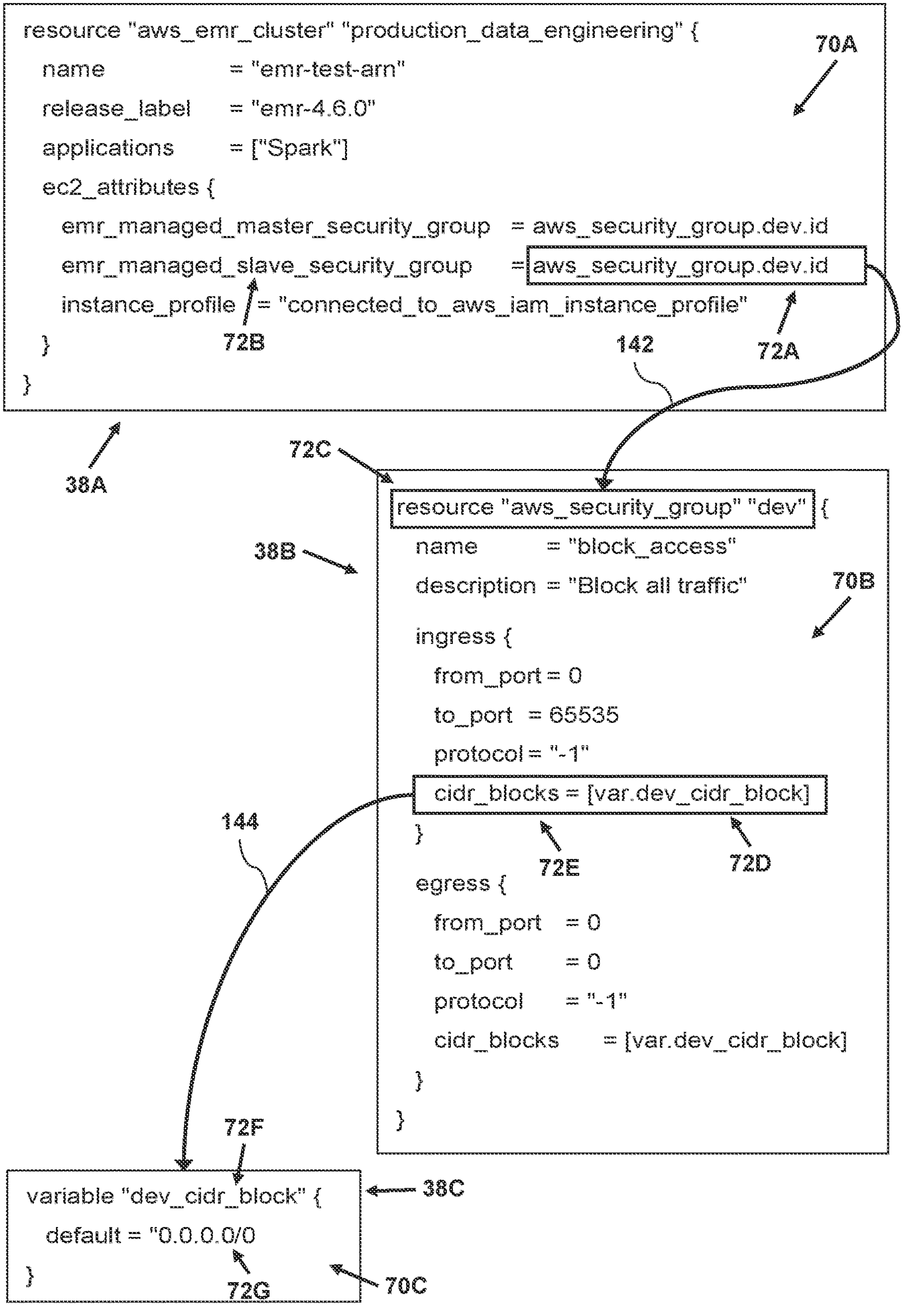
FIG. 7 is an example of a given IaC resource definition whose IaC source code comprises a misconfigured parameter, in accordance with an embodiment of the present invention.

FIG. 7 is an example of IAC source code listing 70 comprising a misconfigured resource definition 38, in accordance with an embodiment of the present invention. In FIG. 7, resource definitions 38, IaC source code listings 70 and code elements 72 can be differentiated by appending a letter to the identifying numeral, so that the resource definitions comprise resource definitions 38A-38C, the IaC source code listings comprise IaC source code listings 70A-70C, and the code elements comprise code elements 72A-72G.

In FIG. 7:

Resource definition 38A comprises resource 72A called "aws_security_group.dev.id" that is assigned to parameter 72B called "em_managed_slave_security_group".

Processor 44 attempts to resolve resource 72A by identifying that resource definition 38B comprises resource declaration 72C that matches resource 72A, as indicated by an arrow 140. Therefore, parameter 72B depends on resource definition 38B.

Resource definition 38B comprises variable 72D called "var.dev_cidr_block" that is assigned to parameter 72E called "cidr_blocks".

Processor 44 attempts to resolve variable 72D by identifying that resource definition 38C comprises variable declaration 72F that matches variable 72D, as indicated by an arrow 142. Therefore, parameter 72E depends on resource definition 38C.

Variable declaration 72*f* comprises value 72G "0.0.0.0/0", which resolves the dependency for variable 72D, which in turn resolves the dependency for resource 72A.

For example, there may comprise a given validation rule 52 whose respective logic asserts that "0.0.0.0" is an invalid Internet protocol (IP) address for a Classless Inter-Domain Routing (CIDR) block resource (i.e., in AWS). In this example, by applying the give validation rule to resource definitions 38A, 38B and 38C, processor 44 can assign "non-compliant" to the respective verdicts 96. Additionally, processor 44 can assign "false" to the respective value flags for resource definitions 38A and 38B (i.e., since resource definition 38A depends on resource definition 38B, and resource definition 38B depends on resource definition 38B), and assign "true" to the respective value flag for resource definition 38C, since value 72G in resource definition 38C resolves the dependencies in resource definitions 38A and 38B.

In step 134, processor determines whether or not there are any additional validation rules 52 that the analysis processor did not select (i.e., in step 124). If there are any additional unselected validation rules 52, then the method continues with step 124. However, if there are no additional unselected validation rules 52, then the method ends.

Returning to step 128, if processor 44 fails to identify any resource definitions 38 to which the selected validation rule can be applied, then the method continues with step 124.

Upon completing the steps in the description referencing the flow diagram in FIG. 6, processor 44 identified a first set of resource definitions 38 that are not in compliance with validation rules 52, and a second set of the resource definitions that are in compliance with validation rules 52.

Misconfigured IAC Fix Recommendation Engine

Figure 8:
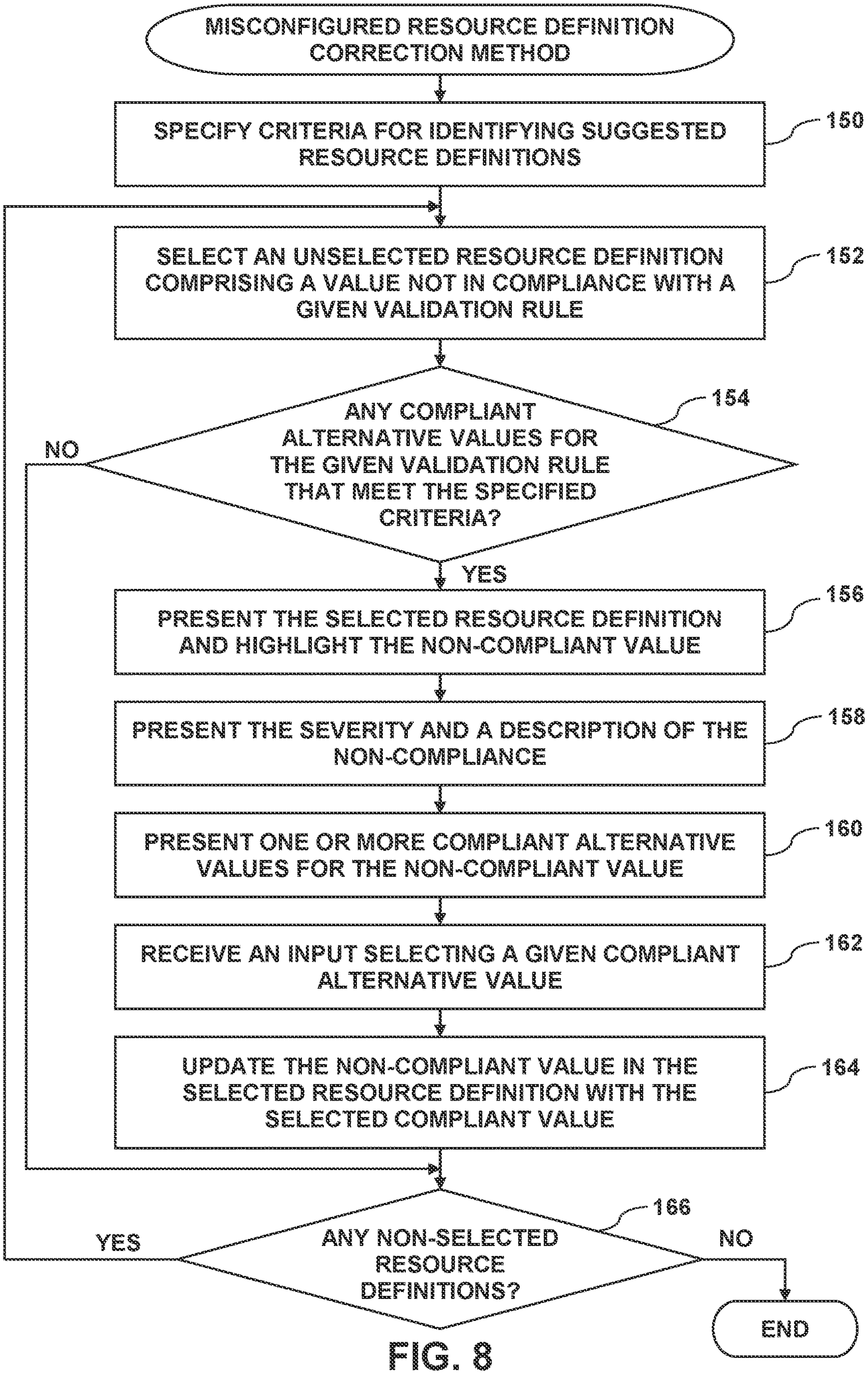
FIG. 8 is a flow diagram that schematically illustrates a method of identifying and presenting correctly configured alternatives to misconfigured IaC resource definitions, in accordance with an embodiment of the present invention.

FIG. 8 is a flow diagram that schematically illustrates a method of correcting misconfigured resource definitions 38 (i.e., the resource definitions whose respective verdicts 96 are "non-compliant"), in accordance with an embodiment of the present invention. In some embodiments, a given resource definition 38 can be considered to be misconfigured if upon applying a given validation rule 52 to the given resource definition, processor 44 detects a given value 72 for a given parameter 72 in the given resource definition that is either missing (i.e., the parameter is not defined) or is not in compliance with the given validation rule. In these embodiments, processor 44 can stores "non-compliant" to the respective verdict 96 for the given resource definition in response to detecting the non-compliant or missing value 72.

In embodiments described herein, a given resource definition 38 that is not in compliance with a given validation rule may also be referred to as non-compliant resource definition 38, and a given resource definition 38 in compliance with a given validation rule may also be referred to as compliant resource definition 38. Similarly, a given value 72 for a given parameter 72 that is not in compliance with a given validation rule may also be referred to as a non-compliant value 75, and a given value 72 for a given parameter 72 in compliance with a given validation rule may also be referred to as a compliant value 72.

In embodiments described herein, for a given resource definition 38 not in compliance with a given validation rule 52, processor 44 can identify, in corpus 37, one or more additional resource definitions 38 in compliance with the given validation rule 52, and then output the non-compliant and the compliant resource definitions together to invoke a revision of the non-compliant resource definition. As described hereinbelow, processor 44 can output the non-compliant and the compliant resource definitions by presenting them together on display 50, wherein the compliant resource definitions comprise "suggested" resource definitions 38 (i.e., to update the non-compliant resource definition), and wherein invoking the revision may updating the non-compliant resource definition with a given compliant resource definition 38 in response to receiving an input from input device 48.

In one embodiment, the non-compliant resource definition comprises a non-compliant value 72 for a given parameter 72, and the one or more compliant resource definitions comprise respective compliant values 72 for the given resource. In this embodiment, processor 44 can output the non-compliant and the compliant resource definitions by presenting their respective values 72 together on display 50, and can invoke the revision by replacing the non-compliant value in the non-compliant resource with one of the compliant values.

In another embodiment, the non-compliant resource definition comprises one or more missing code elements, and the one or more compliant resource definitions comprise respective compliant code elements 72 for the given resource. In these embodiments, processor 44 can (a) output the non-compliant resource definition by presenting an alert on display 50 indicating the missing code element(s), (b) output the compliant resource definitions by presenting their respective code elements on display 50, and (c) invoke the revision by adding the code elements of one of the compliant resource definitions to the non-compliant resource definitions. Examples for these embodiment are described in the description referencing FIGS. 9 and 10 hereinbelow.

In step 150, processor 44 specifies criteria for outputting compliant IaC resource definitions 38. As described supra, processor 44 can output the compliant resource definitions by presenting their respective compliant values 108 on display 50. However, there may be instances where it may not be practical for processor 44 to present all the (distinct) compliant values on display 50 (e.g., if the number of compliant values 108 cannot "fit on display 50). In these instances, processor 44 can apply the specified criteria to the compliant values so as to only present "popular" compliant values 108 that can be used to replace a given non-compliant value 72 in a given resource definition 38.

In some embodiments, the specified criteria may be based on data components (e.g., value count 110 and/or value percentage 112) stored for compliant values 108 in valid definitions database 56. In a first example, a given criteria may specify a maximum number (e.g., 4) of compliant values 108 to output (e.g., to display 50). For example, if the maximum number is 4 and processor 44 detects that there are more than the maximum number of distinct compliant values 108 for the validation rule referenced by validation rule ID 102, the analysis processor can sort the compliant values by their respective value counts in high-to-low order. Processor 44 can then store, to the compliant value records for the validation rule referenced by validation rule ID 102, store YES to the respective availability flags 114 for the 4 highest compliant values 108, and store NO to the respective availability flags 114 for any remaining compliant values 108.

In another example, a given criteria can be based on value counts 110 and value percentages 112:

(value count 110>2) and (value percentage 112>20%)
OR
(value count 110>15) and (value percentage 112>10%)

In this example, processor 44 can apply the given criteria to value counts 110 and value percentages 112 in all the compliant value records, and populate the availability flags in response the applied criteria, as described supra.

Upon specifying the criteria, processor 44 can apply all the specified criteria to all the compliant value records, and set their respective availability flags 114 in response to the applied criteria, as described hereinabove.

In step 152, processor 44 selects a previously unselected resource definition 38 having a given parameter 72 comprising a given value 72 not in compliance with a given validation rule 52. To perform step 152, processor 44 can select, in verdict database 54, a previously unselected verdict record 90 comprising a given verdict 96 and a given validation rule ID 94, wherein the given verdict 96 indicates non-compliance with the verification rule referenced by the given rule ID.

In step 154, processor 44 checks corpus 37 to see if there are any other resource definitions 38 having, for the given parameter, respective values 72 that (a) are in compliance with the verification rule referenced by the given rule ID, and (b) meeting the criteria specified in step 150. To check condition (a), processor 44 can retrieve, from valid definitions database 56, the valid definition record comprising validation rule ID 102 corresponding to the given verification rule, and determine whether or not there are any compliant value records 106 in the retrieved record. If there are any compliant value records 106 in the retrieved record, then processor check condition (b), processor 44 can check if any of the availability flags in the compliant value record(s) in the retrieved record indicate their respective availability.

If processor 44 determines that both conditions (a) and (b) are met (i.e., true), then in step 156, processor 44 presents, on display 50, the selected resource definition. In some embodiments, processor 44 can present the selected resource by presenting, on display 50, the IaC source code listing for the selected resource definition, and highlighting (e.g., present in red) the non-compliant value in the presented IaC source code listing.

Figure 9:
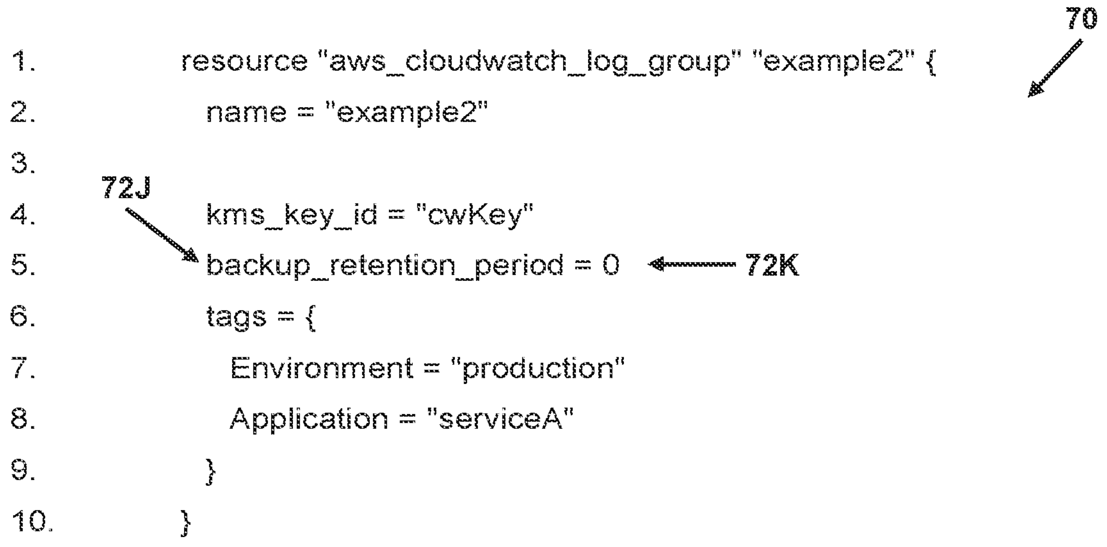
FIG. 9 is an illustration of a user interface presenting an example of a resource definition comprising misconfigured IaC source code, in accordance with an embodiment of the present invention.

FIG. 9 is an example of a given IaC source code listing 70 that is misconfigured, in accordance with an embodiment of the present invention. In FIG. 9 (and in FIG. 10), code elements 72 can be differentiated by appending a letter to the identifying numeral, so that the code elements comprise code elements 72J and 72K.

In the example shown in FIG. 9, the misconfigured IaC source code comprises a given misconfigured parameter 72, wherein the misconfiguration comprising non-compliant value 72K "0" assigned to "retention_in_days" parameter 72J. In some embodiments, processor 44 can identify the non-compliant value by applying a given validation rule 52 whose validation rule logic 82 specifies valid values (or a valid range) for "retention_in_days" parameter 72J, and then detecting that "0" is not in compliance with the given validation rule.

In step 158, processor 44 presents, in UI 170, severity 84 and error message 86 for the given validation rule.

In step 160, processor 44 presents, in UI 170, one or more alternative compliant values 108 for "retention_in_days" parameter 72J, wherein the one or more alternative compliant values also meet the criteria specified in step 150.

Figure 10:
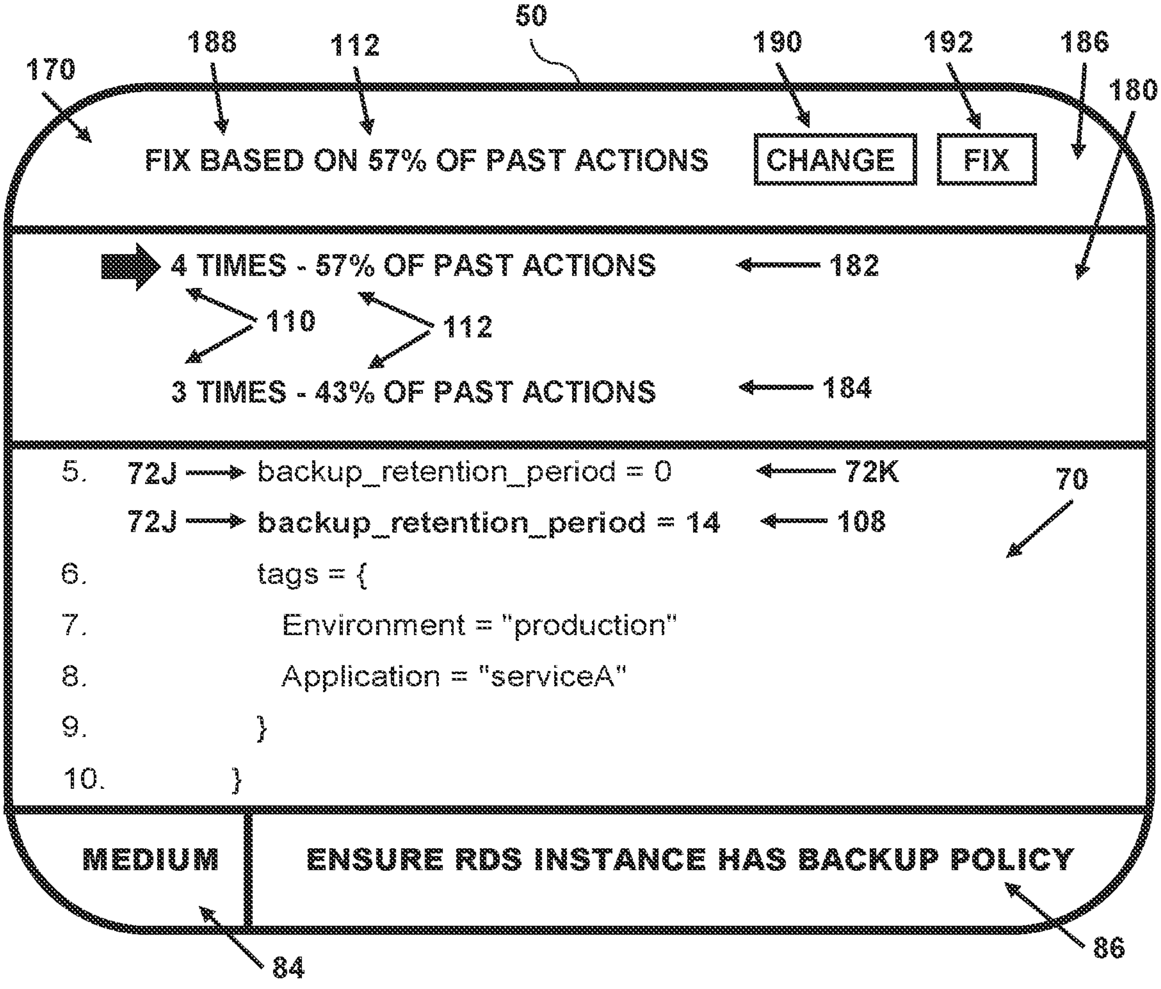
FIG. 10 is an illustration of the user interface presenting an example of correctly configured alternatives to the misconfigured IaC source code, in accordance with an embodiment of the present invention.

FIG. 10 is an illustration of a user interface (UI) 170 that processor 44 can present on display 50 so as to present, to a user (not shown), the one or more alternative compliant values for the misconfigured code element in the source code listing, in accordance with an embodiment of the present invention. In the example shown in FIG. 10, there are two compliant values 108 that also meet the criteria specified in step 150, and processor 44 can present, in UI 170, a window 180 comprising compliant widgets 182 and 184. In this example, processor 44, can present, in widgets 182 and 184, computes statistics comprising the respective value counts 110 and percentages value for the two alternative compliant values.

In some embodiments, if there are more than one alternative compliant values 108 for the misconfigured code element in the IaC source code listing that meet the criteria specified in step 150, processor 44 can sort the compliant values (e.g., by value count 110) and present the compliant values (i.e., in the widgets) in sorted order on display 50.

In step 162, processor 44 receives, from input device 48, an input selecting a given alternative compliant value 108. In the example shown in FIG. 10, processor 44 receives an input indicating selection of widget 182 or 184 (e.g., in response to a user manipulating input device 48 so as to "click on" widget 182 or 184). Upon receiving the input, processor 44 can present, for "retention_in_days" parameter 72J, both the non-compliant value 72K and the selected alternative compliant value 108.

In some embodiments, processor 44 can also present, in UI 170, a window 186 comprising a message 188 comprising the respective value percentage 112 of the selected or more alternative compliant values for the misconfigured code element in the IaC source code listing. In the configuration shown in FIG. 10, window 186 also comprises a change widget 190 and a fix widget 192. If processor 44 receives an input indicating selection of widget 190 (e.g., in response to a user manipulating input device 48 so as to "click on" widget 190) then the analysis processor can enable selection of widget 182 or 184.

However, if processor 44 receives an input indicating selection of widget 192 (e.g., in response to a user manipulating input device 48 so as to "click on" widget 192) then the analysis processor can replace the non-compliant value for the parameter in the selected resource definition with the currently selected alternative compliant value 108. In the example shown in FIG. 10, processor 44 can replace, for "backup_retention_period" parameter 72J, the non-compliant value "0" with the selected compliant value "15".

In step 164, processor 44 updates the non-compliant value for the given parameter with the selected compliant value. As described supra, processor 44 can replace the non-compliant value for the given parameter with the selected compliant value upon receiving, from input device 48, an input indicating selection of fix widget 192.

In addition to detecting a non-compliant value 72, when processor 44 applies a given validation rule 52 to a given resource definition 38, the analysis processor may detect one or more missing parameters 72 and/or one or more missing values 72. For example, the given validation rule may (a) require a backup retention period (i.e., as defined by "backup_retention_period" parameter 72J in FIGS. 9 and 10), and (b) specify valid values 72 for the "backup_retention_period" parameter. In this example, if processor 44 does not detect the "backup_retention_period" parameter in the given resource definition, then the analysis processor can perform step 44 by adding, to the given resource definition, the "backup_retention_period" parameter and a given compliant value 108. In other words, in addition to comprise replacing, in the given resource definition, a given non-compliant value 72 with a given compliant value 108, processor 44 can revise the given resource definition by adding one or more code elements 72 (i.e., one or more parameters 72 and/or one or more values 72) to the given resource definition.

In alternative embodiments, processor 44 can automatically select a given alternative compliant value, and automatically replace the non-compliant value for the given parameter with the automatically selected compliant value. For example, processor 44 can automatically select the alternative compliant value having the highest respective value count 110.

In step 166, if processor 44 detects a previously unselected resource definition 38 having a given parameter 72 comprising a given value 74 not in compliance with a given validation rule 52, then the method continues with step 152. However, if processor 44 has selected all resource definitions 38 having a given parameter 72 comprising a given value 74 not in compliance with a given validation rule 52, then the method ends.

Returning to step 154, if processor 44 determines that both conditions (a) and (b) are not met, then the method continues with step 166.

Application Source Code Analysis

While embodiments described hereinabove use validation rules 54 and valid definitions database 56 for detecting and correcting misconfigured IaC code elements 72 in resource definitions 38, using these embodiments to detect and correct other types of misconfigured source code elements 72 is considered to be within the spirit and scope of the present invention. For example, embodiments of the present invention can be used to detect and correct misconfigured code elements 72 in source code listings 70 for a given software application 57.

In some embodiments, source code 70 (also referred to herein as source code listing 70) may comprise PYTHON source code for a software application, and code elements 72 may comprise PYTHON source code elements such as commands, parameters, function definitions, and calls to functions. In these embodiments, validation rules 54 can be used to detect any code elements 72 that expose the software application (i.e., written in PYTHON) to a security risk (e.g., unauthorized access).

For example, when developing a software application, developers sometimes include debugging code that can be accessed via a "back door". Processor 44 can use the following validation rule 52 to detect any debugging code that was inadvertently left in a deployed software application:

```
id: CKV3__SAST__96
  version: 0.2
  approach: define failing
```

-continued

```
    name: Active Debug Code
    guidelines: |
      Detected Flask app with 'debug=True'. Do not
deploy to production with this flag enabled as it
      will leak sensitive information.  Instead,
consider using Flask configuration variables or
      setting
      'debug' using system environment variables.
    category: sast
    severity: MEDIUM
    cwe: "CWE-489: Active Debug Code"
  scope:
    languages:
      - python
  definition: The product is deployed to unauthorized
actors with debugging code still enabled or active, which
can create unintended entry points or expose sensitive
information.
        - pattern: |
          $APP = flask.Flask(<ANY>)
          <ANY>
          $APP.run(<ANY>, debug=True, <ANY>)
        -  pattern:  flask.Flask(<ANY>).run(<ANY>,
debug=True, <ANY>)
        -  pattern:  uvicorn.run(<ANY>,  reload=True,
<ANY>)
```

By applying this validation rule, processor 44 can detect the misconfigured code element appl.run(debug=True) in the following source code listing 70:

```
import flask
app1=flask.Flask( )
app1.run (debug=True)
```

This source code listing 70 may be referred to herein as non-compliant debug listing 70.

In some embodiments, compliant values 108 may comprise compliant source code elements 72 that processor 44 can present on display 50. For example, processor 44 can present, on display 50, the following correction for the non-compliant source code listing described supra:

```
from flask import Flask
app2=Flask( )
app2.run (debug=False)
```

This source code listing 70 may be referred to herein as compliant debug listing 70.

In some embodiments, processor 44 can apply model 59 to analyze valid definitions database 56 so as to generate suggested fixes to a given non-compliant (i.e., with regards to validation rules 52) code element 72. In these embodiments, processor 44 can identify a given context 69 for the given non-compliant code element, identify one or more additional code elements 70 that have the same context and are compliant with validation rules 52, and present, in UI 170, the identified one or more additional code elements 70. An example of a given context 69 may comprise embedded debugging code, as described supra in non-compliant debug listing 70.

In further embodiments, processor 44 can apply model 59 to generate a new code element 72 (i.e., different from any code element 72 in resource definitions 38) that is compliant with validation rules 72 and has the same context 69 as the given non-compliant code element, and then and present, in UI 170, the new code element. For example, upon detecting non-compliant debug listing 70, processor 44 can generate compliant debug listing 70.

In additional embodiments, applying model 59 can enable processor 44 to present, in error message 86, a description of a security risk that can be exploited by the non-compliant code element. Continuing the example above, processor 44 can present in error message 86, context information such as:

"I can see your project isn't in production, so you are not directly exposed to this weakness and the severity is low. That being said, by scanning your code and history of actions, I can see you have a habit of leaving debug=true also on Production environments, so I highly recommend changing it for all so you won't be later exposed."

In further embodiments, processor 44 can use model 59 for detecting other types of code elements 72 that comprise sensitive information (e.g., tokens, keys, passwords etc.), which should not be visible in source code 70. In supplemental embodiments, processor 44 can use model 59 for security analysis such as Software Compensation Analysis (SCA) that scans package manager files to detect any libraries/packages that have security vulnerabilities such as imported third party code.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for automatically improving source code security, comprising:

accessing, by a processor, a corpus of source code listings for one or more software applications, wherein the corpus of source code listings comprises respective code elements;

accessing, by the processor, a repository of validation rules defining respective acceptable security parameters for the respective code elements, wherein validation rules in the repository of validation rules are configured to detect when an associated value of a configuration parameter enables an insecure operational mode of a given software application of the one or more software applications;

performing, by the processor, static analysis of the corpus of source code listings by analyzing the corpus of source code listings and applying, by the processor, the validation rules to the respective code elements in the corpus of source code listings so as to identify a first set of the respective code elements in the corpus of source code listings not in compliance with the validation rules and a second set of the respective code elements in the corpus of source code listings in compliance with the validation rules;

selecting, by the processor, from the first set of the respective code elements in the corpus of source code listings, a first code element not in compliance with a given validation rule of the validation rules;

wherein the first code element comprises a configuration parameter and an associated value in a source code listing for the given software application of the one or more software applications, wherein the configuration parameter controls an operational mode of the given software application of the one or more software applications during execution, and wherein the associated value sets the operational mode of the given software application of the one or more software applications to an insecure operational mode that exposes the given software application of the one or more software applications to unauthorized access;

identifying, by the processor, in the second set of the respective code elements in the corpus of source code listings, one or more second code elements in compliance with the given validation rule of the validation rules; wherein each second code element of the one or more second code elements comprises the configuration parameter and a respective associated value in the source code listing for the given software application of the one or more software applications, and wherein the respective associated value sets the operational mode of the given software application of the one or more software applications to a secure operational mode;

automatically generating, by the processor, a replacement code element by modifying the first code element based on security features of the one or more second code elements to bring the first code element into compliance with the given validation rule of the validation rules;

automatically invoking, by the processor, a revision of the first code element by replacing, in the corpus of source code listings, the first code element with the automatically generated replacement code element to generate modified source code listings; and storing, by the processor, the modified source code listings in a code repository.

2. The method according to claim 1, wherein modifying the first code element based on the one or more second code elements comprises replacing the first code element with a given second code element.

3. The method according to claim 1, wherein modifying the first code element based on the one or more second code elements comprises adding a given second code element to the first code element.

4. The method according to claim 1, further comprising outputting, by the processor, the first code element and the one or more second code elements together by presenting, on a display, the first code element and at least one of the one or more second code elements.

5. The method according to claim 4, further comprising receiving, by the processor, an input indicating a selection of a given presented second code element; and replacing, by the processor, in response to the received input, a given first code element with the selected given presented second code element.

6. The method according to claim 4, further comprising identifying, by the processor, a plurality of distinct second code elements.

7. The method according to claim 6, further comprising computing, by the processor, respective counts of instances of the plurality of distinct second code elements; and sorting, by the processor, the plurality of distinct second code elements by their respective counts into a sorted order, wherein presenting the one or more second code elements comprises presenting the plurality of distinct second code elements in the sorted order.

8. The method according to claim 6, further comprising computing, by the processor, respective statistics for the plurality of distinct second code elements, wherein presenting the one or more second code elements comprises presenting the plurality of distinct second code elements and their respective statistics.

9. The method according to claim 8, further comprising applying, by the processor, specified criteria to the computed respective statistics for the plurality of distinct second code elements; and identifying, by the processor, one or more distinct second code elements of the plurality of distinct second code elements whose respective statistics comply with the specified criteria, wherein presenting the one or more second code elements comprises presenting the plurality of distinct second code elements compliant with the specified criteria.

10. The method according to claim 8, further comprising computing, by the processor, respective counts of instances of the plurality of distinct second code elements, wherein the computed respective statistics for the plurality of distinct second code elements comprise the computed respective counts of instances of the plurality of distinct second code elements.

11. The method according to claim 8, further comprising computing, by the processor, respective percentages of instances of the plurality of distinct second code elements, wherein the computed respective statistics for the plurality of distinct second code elements comprise the computed respective percentages of the instances of the plurality of distinct second code elements.

12. The method according to claim 4, wherein the validation rules comprise respective severity levels, and further comprising presenting, by the processor, on the display, a severity level for the given validation rule of the validation rules.

13. The method according to claim 4, wherein the validation rules comprise respective error messages, and further comprising presenting, by the processor, on the display, an error message for the given validation rule of the validation rules.

14. The method according to claim 1, further comprising identifying, by the processor, respective intended uses of the respective code elements, wherein the first code element has a given intended use, and wherein identifying the one or more second code elements comprises identifying the one or more second code elements having the given intended use.

15. The method according to claim 14, wherein automatically generating, by the processor, the replacement code element comprises automatically generating, by the processor, the replacement code element in compliance with the given validation rule of the validation rules and having the given intended use.

16. The method according to claim 14, further comprising generating, by the processor, based on the given intended use, a description of a security risk in the first code element; and outputting, by the processor, the description of the security risk in the first code element.

17. An apparatus for automatically improving source code security, comprising:

a memory configured to store:

a corpus of source code listings for one or more software applications, wherein the corpus of source code listings comprises respective code elements; and a repository of validation rules defining respective acceptable security parameters for the respective code elements, wherein validation rules in the repository of validation rules are configured to detect when an associated value of a configuration parameter enables an insecure operational mode of a given software application of the one or more software applications; and at least one processor configured:

to access the corpus of source code listings and the repository of validation rules;

to perform static analysis of the corpus of source code listings by analyzing the corpus of source code listings and to apply the validation rules to the respective code elements in the corpus of source code listings so as to identify a first set of the respective code elements in the corpus of source code listings not in compliance with the validation rules and a second set of the respective code elements in the corpus of source code listings in compliance with the validation rules;

to select, from the first set of the respective code elements in the corpus of source code listings, a first code element not in compliance with a given validation rule of the validation rules:

wherein the first code element comprises a configuration parameter and an associated value in a source code listing for the given software application of the one or more software applications, wherein the configuration parameter controls an operational mode of the given software application of the one or more software applications during execution, and wherein the associated value sets the operational mode of the given software application of the one or more software applications to an insecure operational mode that exposes the given software application of the one or more software applications to unauthorized access;

to identify in the second set of the respective code elements in the corpus of source code listings, one or more second code elements in compliance with the given validation rule of the validation rules:

wherein each second code element of the one or more second code elements comprises the configuration parameter and a respective associated value in the source code listing for the given software application of the one or more software applications, and wherein the respective associated value sets the operational mode of the given software application of the one or more software applications to a secure operational mode;

to automatically generate a replacement code element by modifying the first code element based on security features of the one or more second code elements to bring the first code element into compliance with the given validation rule of the validation rules;

to automatically invoke a revision of the first code element by replacing, in the corpus of source code listings, the first code element with the automatically generated replacement code element to generate modified source code listings; and to store the modified source code listings in a code repository.

18. A computer software product, the computer software product comprising a non-transitory computer-readable medium, in which program instructions are stored, which when read by a computer, cause the computer:

to access a corpus of source code listings for one or more software applications, wherein the corpus of source code listings comprises respective code elements;

to access a repository of validation rules defining respective acceptable security parameters for the respective code elements, wherein validation rules in the repository of validation rules are configured to detect when an associated value of a configuration parameter enables an insecure operational mode of a given software application of the one or more software applications;

to perform static analysis of the corpus of source code listings by analyzing the corpus of source code listings and to apply the validation rules to the respective code elements in the corpus of source code listings so as to identify a first set of the respective code elements in the corpus of source code listings not in compliance with the validation rules and a second set of the respective code elements in the corpus of source code listings in compliance with the validation rules;

to select, from the first set of the respective code elements in the corpus of source code listings, a first code element not in compliance with a given validation rule of the validation rules;

wherein the first code element comprises a configuration parameter and an associated value in a source code listing for the given software application of the one or more software applications, wherein the configuration parameter controls an operational mode of the given software application of the one or more software applications during execution, and wherein the associated value sets the operational mode of the given software application of the one or more software applications to an insecure operational mode that exposes the given software application of the one or more software applications to unauthorized access;

to identify, in the second set of the respective code elements in the corpus of source code listings, one or more second code elements in compliance with the given validation rule of the validation rules;

wherein each second code element of the one or more second code elements comprises the configuration parameter and a respective associated value in the source code listing for the given software application of the one or more software applications, and wherein the respective associated value sets the operational mode of the given software application of the one or more software applications to a secure operational mode;

to automatically generate a replacement code element by modifying the first code element based on security features of the one or more second code elements to bring the first code element into compliance with the given validation rule of the validation rules;

to automatically invoke a revision of the first code element by replacing, in the corpus of source code listings, the first code element with the automatically generated replacement code element to generate modified source code listings; and to store the modified source code listings in a code repository.

* * * * *